United States Patent
Wortmann et al.

(10) Patent No.: US 9,133,382 B2
(45) Date of Patent: Sep. 15, 2015

(54) NITRATE SALT COMPOSITIONS COMPRISING ALKALI METAL CARBONATE AND THEIR USE AS HEAT TRANSFER MEDIUM OR HEAT STORAGE MEDIUM

(71) Applicant: BASF SE, Ludwigshafen (DE)

(72) Inventors: Jürgen Wortmann, Limburgerhof (DE); Michael Lutz, Speyer (DE); Ter Maat Johan, Mannheim (DE); Kerstin Schierle-Arndt, Zwingenberg (DE); Stephan Maurer, Neustadt-Gimmeldingen (DE); Michael Ladenberger, Darstein (DE); Karolin Geyer, Mannheim (DE); Florian Garlichs, Neustadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/859,799

(22) Filed: Apr. 10, 2013

(65) Prior Publication Data
US 2013/0264514 A1    Oct. 10, 2013

Related U.S. Application Data

(60) Provisional application No. 61/622,026, filed on Apr. 10, 2012.

(51) Int. Cl.
| | | |
|---|---|---|
| C09K 5/00 | (2006.01) | |
| C09K 5/12 | (2006.01) | |
| C09K 5/06 | (2006.01) | |

(52) U.S. Cl.
CPC .... C09K 5/12 (2013.01); C09K 5/06 (2013.01)

(58) Field of Classification Search
CPC .............. C09K 5/00; C09K 5/10; C09K 5/12; F24J 2/14; F28D 20/00; F28D 20/0056; F28D 20/02; F28D 2020/0047
USPC ....................................................... 252/70, 71
See application file for complete search history.

(56) References Cited

U.S. PATENT DOCUMENTS

| | | | | |
|---|---|---|---|---|
| 2,375,761 | A |   | 5/1945 | Bates |
| 3,793,208 | A | * | 2/1974 | Foreman .......................... 252/71 |
| 4,340,578 | A | * | 7/1982 | Erickson ........................ 423/579 |
| 4,421,662 | A | * | 12/1983 | Fiorucci et al. ................. 252/70 |
| 4,448,611 | A | * | 5/1984 | Grellet et al. .................. 148/242 |
| 4,529,577 | A | * | 7/1985 | Chen et al. ..................... 423/351 |
| 4,534,794 | A | * | 8/1985 | Walter et al. ................ 106/14.05 |
| 4,559,993 | A | * | 12/1985 | Picard et al. ..................... 252/71 |
| 5,035,769 | A | * | 7/1991 | Stout et al. ........................ 216/91 |
| 5,514,226 | A | * | 5/1996 | Terrat et al. ................... 148/242 |
| 5,576,066 | A | * | 11/1996 | Polti ............................. 427/435 |
| 7,588,694 | B1 | * | 9/2009 | Bradshaw et al. ............... 252/71 |
| 2010/0038581 | A1 | * | 2/2010 | Gladen et al. ................... 252/67 |
| 2013/0264514 | A1 |   | 10/2013 | Wortmann et al. |
| 2014/0047837 | A1 |   | 2/2014 | Wortmann et al. |
| 2014/0049052 | A1 |   | 2/2014 | Wortmann et al. |

FOREIGN PATENT DOCUMENTS

| | | |
|---|---|---|
| GB | 545590 A | 6/1942 |

OTHER PUBLICATIONS

Hitec(R) Solar Salt, Technical Brochure, obtained from wayback machine (web.archive.org) of www.coastalchem.com/proceess-literature-files.html capture of Mar. 6, 2011.*
Alexander, J., et al., "Phase Relations in Heat Transfer Salt Systems", Industrial and Engineering Chemistry, vol. 39, (1947). pp. 1044-1049.
Bauer, T., et al., "Overview of Molten Salt Storage Systems and Material Development for Solar Thermal Power Plants", World Renewable Energy Forum WREF, vol. 2 (2012), pp. 837-844.
Olivares, R., "The thermal stability of molten nitrite/nitrates salt for solar thermal energy storage in different atmospheres", Solar Energy, vol. 86, (2012), pp. 2576-2583.
Hitec® Solar Salt, Technical Brochure, sent by Examiner in U.S. Appl. No. 13/859,799 and obtained by Examiner from wayback machine (web. Archive.org) of www.coastalchem.com/process-literalture-files.html capture of Mar. 6, 2011.

* cited by examiner

*Primary Examiner* — Jane L Stanley
(74) *Attorney, Agent, or Firm* — Drinker Biddle & Reath LLP

(57) ABSTRACT

A nitrate salt composition comprising A) an alkali metal nitrate and optionally an alkali metal nitrite in a total amount in the range from 90 to 99.84% by weight and B)an alkali metal compound selected from the group B1) alkali metal oxide, B2) alkali metal carbonate, B3) alkali metal compound which decomposes into alkali metal oxide or alkali metal carbonate in the temperature range from 250° C. to 600° C., B4) alkali metal hydroxide MetOH, in which Met is lithium, sodium, potassium, rubidium, cesium, B5) alkali metal peroxide $Met_2O_2$, in which Met is lithium, sodium, potassium, rubidium, cesium, and B6) alkali metal superoxide $MetO_2$, in which Met is sodium, potassium, rubidium, cesium, in a total amount in the range from 0.16 to 10% by weight, in each case based on the nitrate salt composition.

6 Claims, No Drawings

NITRATE SALT COMPOSITIONS COMPRISING ALKALI METAL CARBONATE AND THEIR USE AS HEAT TRANSFER MEDIUM OR HEAT STORAGE MEDIUM

CROSS-REFERENCE TO RELATED APPLICATIONS

This application claims the benefit of U.S. Provisional Application 61/622,026, filed Apr. 10, 2012, which is incorporated herein by reference.

DESCRIPTION

The present invention relates to nitrate salt compositions as defined in the claims, and also to their use as heat transfer medium and/or heat storage medium as likewise defined in the claims.

Heat transfer media or heat storage media based on inorganic solids, in particular salts, are known both in chemical technology and in power station engineering. They are generally used at high temperatures, for example above 100° C., therefore above the boiling point of water at atmospheric pressure.

For example, salt bath reactors are used at temperatures of from about 200 to 500° C. in chemical plants for the industrial preparation of various chemicals.

Heat transfer media are media which are heated by a heat source, for example the sun in solar thermal power stations, and transport the heat present therein over a particular distance. They can then transfer this heat to another medium, for example water or a gas, preferably via heat exchangers, with this other medium then being able to drive, for example, a turbine. However, heat transfer media can also transfer the heat present therein to another medium, (for example a salt melt) present in a stock vessel and thus pass on the heat for storage. However, heat transfer media can also themselves be fed into a stock vessel and remain there. They are then themselves both heat transfer media and heat storage media.

Heat stores comprise heat storage media, usually chemical compositions, for example the mixtures according to the invention, which can store a quantity of heat for a particular time. Heat stores for fluid, preferably liquid, heat storage media are usually formed by a fixed vessel which is preferably insulated against heat loss.

A still relatively new field of application for heat transfer media or heat storage media are solar thermal power stations for generating electric energy. In these, focused solar radiation heats a heat transfer medium which passes its heat on via a heat exchanger to water and thus generates steam which drives a turbine which ultimately, as in a conventional electric power station, drives a generator to generate electric energy.

Three types of solar thermal power stations are of particular importance: the parabolic trough power station, the Fresnel power station and the tower power station.

In the parabolic trough power station, the solar radiation is focused via parabolic mirror grooves into the focal line of the mirrors. There, there is a tube filled with a heat transfer medium. The heat transfer medium is heated by the solar radiation and flows to the heat exchanger where it releases its heat, as described above, in order to generate steam.

In the Fresnel power station, the solar radiation is focused by means of generally flat mirrors onto a focal line. There, there is a tube through which a heat transfer medium flows. In contrast to the parabolic trough power station, the mirror and the tube do not jointly follow the position of the sun, but instead the setting of the mirrors is adjusted relative to the fixed tube. The setting of the mirrors follows the position of the sun so that the fixed tube is always in the focal line of the mirrors. In Fresnel power stations, too, molten salt can be used as heat transfer medium. Salt Fresnel power stations are at present largely still being developed. The generation of steam in the salt Fresnel power station is carried out analogously to the parabolic trough power station.

In the case of the solar thermal tower power station, a tower is ringed by mirrors which focus the solar radiation onto a central receiver in the upper part of the tower. In the receiver, a heat transfer medium is heated to produce steam in order to generate electric energy via heat transfer media in a manner analogous to the parabolic trough power station or Fresnel power station.

At present, an organic heat transfer medium composed of diphenyl ether and biphenyl, also referred to as "thermal oil" is used in the parabolic trough power station. However, this heat transfer medium can be used only up to 400° C. since it decomposes during prolonged operation above this range.

However, it is desirable to increase the temperature of the heat transfer medium on arrival in the heat exchanger of the steam generator (the steam entry temperature) to above 400° C. since the efficiency of the steam turbine is then increased (at a steam entry temperature of 400° C., the Carnot efficiency is about 42%; at 500° C., for example, it increases to above about 50%).

If a mixture of about 60% by weight of sodium nitrate ($NaNO_3$) and about 40% by weight of potassium nitrate ($KNO_3$) is used as heat transfer medium instead of the organic heat transfer medium, as has already been implemented in solar thermal tower power stations, this can be heated to a maximum of about 565° C. in the long term. Above this temperature, the nitrate mixture mentioned also decomposes over time, generally with release of nitrous oxides, usually nitrogen monoxide and/or nitrogen dioxide.

It would in principle be quite possible technically to heat the heat transfer media in solar thermal power stations to temperatures of about 650° C., for example at the focal point of a tower power station, and thus achieve higher efficiencies of the steam turbine, similar to the case of fossil fuel-fired power stations.

It is therefore desirable to increase the thermal stability of heat transfer media in long-term operation to above about 565° C.

It is very desirable to match the generation of electric energy in a solar thermal power station, regardless of which type, to the demand on the grid. This is made possible, for example, by heat being stored during times of high incident solar radiation and being able to be utilized to generate electric energy when required after sundown or during phases of bad weather.

The storage of heat can be effected directly by storage of the heated heat transfer medium in generally well insulated stock tanks or indirectly by transfer of the heat from the heated heat transfer medium to another medium (heat store), for example in a sodium nitrate-potassium nitrate salt melt.

An indirect method has been realized in the 50 MW Andasol I power station in Spain, where about 28 500 metric tons of a melt of sodium nitrate and potassium nitrate (60:40 in % by weight) are used as heat storage in a well insulated tank. During periods of incident solar radiation, the melt is pumped from a relatively cool tank (about 290° C.) via a thermal oil-salt heat exchanger to a hotter tank and in the process heated to about 390° C. Here, heat energy is withdrawn from the thermal oil (here functioning as heat transfer medium) via a heat exchanger and introduced into the salt melt (thermal oil-salt heat exchanger). During times of low incident solar radiation and at night, the power station can be operated under full load for about 7.5 hours when the heat store is fully charged.

However, it would be advantageous to use the heat transfer medium as heat storage medium as well, since the corresponding thermal oil-salt heat exchangers could be saved in this way.

In addition, possible contact of the thermal oil, which has reducing properties, with the strongly oxidizing nitrate melt could be avoided in this way. Owing to the significantly higher price of the thermal oil compared to the sodium nitrate-potassium nitrate melt, thermal oil has hitherto not been considered as heat store.

It is an object of the invention to provide a readily available, improved nitrate salt composition as heat transfer medium and/or heat storage medium which can be used in long-term operation at elevated temperature, preferably above 565° C., with the release of nitrous oxides, usually nitrogen monoxide and/or nitrogen dioxide, being reduced or suppressed.

A nitrate mixture composed of about 60% by weight of sodium nitrate ($NaNO_3$) and about 40% by weight of potassium nitrate ($KNO_3$) is, for example, offered for sale under the name Hitec® Solar Salt by Coastal Chemical Co., L.L.C. This product is offered for use as heat transfer medium or heat storage medium. It can, in addition to further components, comprise small amounts of up to a maximum of 0.15% by weight of sodium carbonate ($Na_2CO_3$) (product information sheet Hitec® Solar Salt).

For reasons of simplicity, the nitrate salt compositions defined in the description and in the claims, especially their preferred and particularly preferred embodiments, will hereinafter also be referred to as "nitrate salt composition of the invention".

The nitrate salt composition of the invention comprises an alkali metal nitrate and optionally an alkali metal nitrite as significant constituents A).

The alkali metal nitrate here is a nitrate, preferably a virtually water-free nitrate, particularly preferably a nitrate free of water of crystallization, of the metals lithium, sodium, potassium, rubidium or cesium, generally described as $MetNO_3$, where Met represents the above-described alkali metals; the term alkali metal nitrate encompasses both a single nitrate and mixtures of the nitrates of these metals, for example potassium nitrate plus sodium nitrate.

The alkali metal nitrite here is a nitrite, preferably a virtually water-free nitrite, particularly preferably a nitrite which is free of water of crystallization, of the alkali metals lithium, sodium, potassium, rubidium and cesium, generally described as $MetNO_2$, where Met represents the above-described alkali metals. The alkali metal nitrite can be present as single compound or else as a mixture of various alkali metal nitrites, for example sodium nitrite plus potassium nitrite.

The constituent A) is present in a total amount in the range from 90 to 99.84% by weight, preferably in the range from 95 to 99.84% by weight, particularly preferably in the range from 95 to 99.8% by weight, very particularly preferably in the range from 98 to 99.8% by weight, in each case based on the nitrate salt composition of the invention.

The constituent A) can comprise an alkali metal nitrite, as described above, in an amount in the range from 0 to 50% by weight, preferably in the range from 1 to 10% by weight, particularly preferably in the range from 2 to 5% by weight, in each case based on the constituent A).

A well-suited alkali metal nitrate component $MetNO3$ of the constituent A) is composed, for example, of
A1) potassium nitrate in an amount in the range from 20 to 55% by weight,
A2) sodium nitrate in an amount in the range from 45 to 80% by weight, in each case based on the alkali metal nitrate component $MetNO_3$ of the constituent A).

A well-suited alkali metal nitrite component $MetNO_2$ of the constituent A) is composed, for example, of
A1) potassium nitrite in an amount in the range from 20 to 55% by weight,
A2) sodium nitrite in an amount in the range from 45 to 80% by weight, in each case based on the alkali metal nitrite component $MetNO_2$ of the constituent A).

In a further embodiment of the nitrate salt composition, the constituent A) comprises only one type of alkali metal nitrate, for example potassium nitrate or sodium nitrate.

The nitrate salt composition of the invention further comprises, as significant constituent B), an alkali metal compound selected from the group B1) alkali metal oxide $Met_2O$, in which Met is lithium, sodium, potassium, rubidium, cesium, preferably sodium and/or potassium, B2) alkali metal carbonate, B3) alkali metal compound which decomposes into alkali metal oxide or alkali metal carbonate in the temperature range from 250° C. to 600° C., B4) alkali metal hydroxide MetOH, in which Met is lithium, sodium, potassium, rubidium, cesium, preferably sodium and/or potassium, B5) alkali metal peroxide $Met_2O_2$, in which Met is lithium, sodium, potassium, rubidium, cesium, preferably sodium and/or potassium, and B6) alkali metal superoxide $MetO2$, in which Met is sodium, potassium, rubidium, cesium, preferably sodium and/or potassium, in a total amount in the range from 0.16 to 10% by weight, preferably in the range from 0.16 to 5% by weight, particularly preferably in the range from 0.2 to 5% by weight, very particularly preferably in the range from 0.2 to 2% by weight, in each case based on the nitrate salt composition.

Preference is given to alkali metal compounds B3) which decompose into alkali metal oxide, preferably sodium oxide, or into alkali metal carbonate, preferably sodium carbonate, at the typical high operating temperatures of nitrate salt melts in a solar thermal power station, i.e. at from 250° to 600° C., preferably from 300° C. to 500° C., under the corresponding oxidizing conditions. Examples of such alkali metal compounds are alkali metal salts such as lithium, sodium, potassium, rubidium or cesium salts of carboxylic acids such as formic acid, acetic acid, oxalic acid, for example sodium formate, sodium acetate, potassium oxalate.

The nitrate salt composition of the invention comprises as preferred significant constituent B) an alkali metal carbonate in a total amount in the range from 0.16 to 10% by weight, preferably in the range from 0.16 to 5% by weight, particularly preferably in the range from 0.2 to 5% by weight, very particularly preferably in the range from 0.2 to 2% by weight, in each case based on the nitrate salt composition.

The alkali metal carbonate is a carbonate, preferably a virtually water-free carbonate, of the alkali metals lithium, sodium, potassium, rubidium and cesium, generally described as $Met_2CO_3$, where Met represents the above-described alkali metals. The alkali metal carbonate can be present as single compound or else as a mixture of various alkali metal carbonates, for example sodium carbonate plus potassium carbonate.

In a well-suited embodiment of the nitrate salt composition, the constituent B) is formed virtually exclusively by alkali metal carbonate $Met_2CO_3$, preferably by sodium carbonate $Na_2CO3$ either alone or together with further alkali metal carbonates selected from the group consisting of lithium carbonate $Li_2CO_3$, potassium carbonate $K_2CO_3$, rubidium carbonate $Rb_2CO_3$, cesium carbonate $Cs_2CO_3$, preferably lithium carbonate $Li_2CO_3$ and/or potassium carbonate $K_2CO_3$.

The amount of constituent B), preferably alkali metal carbonate, in particular sodium carbonate, present in the nitrate salt composition of the invention should, according to the present state of knowledge, be not less than 0.16% by weight, preferably 0.2% by weight, since otherwise the stabilizing effect of the constituent B), preferably the alkali metal carbonate, is lost.

The amount of constituent B), preferably alkali metal carbonate, in particular sodium carbonate, present in the nitrate salt composition of the invention should not exceed 10% by weight, preferably 5% by weight, particularly preferably 2% by weight.

At higher contents of constituent B), preferably alkali metal carbonate, there is a risk that particles of the constituent B), preferably alkali metal carbonate particles, which are, for example, too large and/or are not dissolved in the melt of the nitrate salt composition of the invention can give rise to malfunctions in the piping, pump and apparatus system of the solar thermal power station or the chemical plant.

The upper limit to the content of constituent B), preferably the alkali metal carbonate content, of the nitrate salt composition of the invention can be influenced by various parameters, for example the temperature of a corresponding melt of the nitrate salt composition of the invention or the precise composition thereof.

Apart from the abovementioned significant components, the nitrate salt composition of the invention can additionally comprise traces of impurities, for example sodium chloride, sodium sulfate, calcium oxide, magnesium oxide, silicon dioxide, aluminum oxide, iron oxide or water.

The sum of these impurities is generally not more than 1% by weight, based on the nitrate salt composition of the invention.

The sum of all constituents of the nitrate salt composition of the invention is 100% by weight.

The nitrate salt composition of the invention goes over into the molten and usually pumpable form at a temperature above from about 150 to 300° C., depending, inter alia, on the nitrite content and the ratio of the cations forming the constituent A) and/or B).

The nitrate salt composition of the invention, preferably in molten form, for example as pumpable liquid, is used as heat transfer medium and/or heat storage medium, preferably in power stations for generating heat and/or electricity, in chemical process engineering, for example in salt bath reactors, and in metal hardening plants.

Examples of power stations for generating heat and/or electric energy are solar thermal power stations such as parabolic trough power stations, Fresnel power stations, tower power stations.

In a well-suited embodiment, the nitrate salt compositions of the invention are used, preferably in the molten state, for example as pumpable liquid, both as heat transfer medium and as heat storage medium in the solar thermal power stations, for example the parabolic trough power stations, the tower power stations or the Fresnel power stations.

In a further well-suited embodiment, the nitrate salt compositions of the invention are used, preferably in the molten state, for example as pumpable liquid, either as heat transfer medium or as heat storage medium in the solar thermal power stations, for example the parabolic trough power stations, the tower power stations, the Fresnel power stations.

For example, the nitrate salt compositions of the invention are used, preferably in the molten state, for example as pumpable liquid, in tower power stations as heat transfer medium and/or as heat storage medium, particularly preferably as heat transfer medium.

When the nitrate salt compositions of the invention are used, preferably in the molten state, for example as pumpable liquid, as heat transfer medium in the solar thermal power stations, for example the parabolic trough power stations, the tower power stations, the Fresnel power stations, the heat transfer media are conveyed through tubes heated by the heat of the sun. They usually convey the heat arising there to a heat store or to the heat exchanger of the steam heater of a power station.

The heat store generally comprises two large vessels, normally a cold vessel and a hot vessel. The nitrate salt composition of the invention, preferably the molten state, for example as pumpable liquid, is usually taken from the cold vessel of the solar plant and heated in the solar field of a parabolic trough plant or a tower receiver. The hot molten salt mixture which has been heated in this way is usually conveyed into the hot vessel and stored there until there is demand for the production of electric energy.

The hot nitrate salt compositions of the invention are then usually taken off in the molten state, for example as pumpable liquid, from the hot tank and pumped to the steam generator of a steam power station. The steam produced there and pressurized to above 100 bar generally drives a turbine and a generator which supplies electric energy to the electricity grid.

At the steam generator, the nitrate salt compositions of the invention are generally cooled to about 290° C. in the molten state, for example as pumpable liquid, and usually conveyed back into the cold tank. When transferring heat from the tubes heated by heat from the sun to the store or to the steam generator, the nitrate salt composition of the invention in molten form acts as heat transfer medium. Introduced into the heat storage vessel, the same nitrate salt composition of the invention acts as heat storage medium in order to make demand-oriented production, for example, of electric energy possible.

However, the nitrate salt composition of the invention is, preferably in molten form, also used as heat transfer medium and/or heat storage medium, preferably heat transfer medium, in chemical process engineering, for example for heating reaction apparatuses of chemical production plants where, in general, a very large heat flow has to be transferred at very high temperatures within narrow fluctuation limits. Examples are salt bath reactors. Examples of the abovementioned production plants are acrylic acid plants or plants for producing melamine.

EXAMPLES

Example 1

500 g of solar salt (300 g of $NaNO_3$, 200 g of $KNO_3$) were admixed with 5 g of sodium carbonate (corresponding to 0.11% by mass of carbon) and heated to 300° C. in a stainless steel vessel. 6 g of NO mixed with 5 l of water- and carbon dioxide-free air were subsequently introduced into the melt over a period of one hour. Analysis of the melt after the end of the experiment gave a total carbon content of 0.031% by mass. In this experiment, 2 g of NO equivalents were able to be bound by conversion of the carbonate.

The nitrate/nitrite ratio (in % by weight) had not changed significantly, as was confirmed by wet chemical analysis of the corresponding ions.

Example 2

500 g of HITEC® (35 g of NaNO$_3$, 265 g of KNO$_3$, 200 g of NaNO$_2$) were admixed with 5 g of sodium carbonate (corresponding to 0.11% by mass of carbon) and heated to 300° C. in a stainless steel vessel. 15.2 g of NO mixed with 10 l of water- and carbon dioxide-free air were subsequently introduced into the melt over a period of two hours. The originally insoluble sodium carbonate was completely dissolved after the experiment. Analysis of the melt indicated a total carbon content of 0.02% by mass. In this experiment, 2.3 g of NO equivalents were able to be bound by conversion of the carbonate.

The nitrate/nitrite ratio (in % by weight) had not changed significantly, as was confirmed by wet chemical analysis of the corresponding ions.

Example 3

500 g of solar salt (300 g of NaNO$_3$, 200 g of KNO$_3$) were admixed with 5 g of Na$_2$O/Na$_2$O$_2$ (80:20) and heated to 400° C. in a stainless steel vessel. 10.4 g of NO mixed with 5 l of water- and carbon dioxide-free air were subsequently introduced into the melt over a period of one hour. After hydrolysis, the hydroxide content of the salt melt was below the detection limit (<0.1 g/100 g). In this experiment, 4.6 g of NO equivalents were thus able to be bound by conversion of the oxide.

The nitrate/nitrite ratio (in % by weight) had not changed significantly, as was confirmed by wet chemical analysis of the corresponding ions.

Example 4

500 g of solar salt (300 g of NaNO$_3$, 200 g of KNO$_3$) were admixed with 5 g of NaOH and heated to 300° C. in a stainless steel vessel. 12.8 g of NO2, greatly diluted with 50 l of water- and carbon dioxide-free air, were subsequently introduced into the melt. After hydrolysis, the hydroxide content of the salt melt was 0.1 g/100 g. In this experiment, 4.4 g of NO2 equivalents were thus able to be bound by conversion of the hydroxide.

The nitrate/nitrite ratio (in % by weight) had not changed significantly, as was confirmed by wet chemical analysis of the corresponding ions.

Example 5

500 g of HITEC® (35 g of NaNO$_3$, 265 g of KNO$_3$, 200 g of NaNO$_2$) were admixed with 8 g of NaOH and heated to 200° C. in a stainless steel vessel. 15.3 g of NO mixed with 10 l of water- and carbon dioxide-free air were subsequently introduced into the melt. After hydrolysis, the hydroxide content of the melt was below the detection limit (<0.1 g/100 g). In this experiment, 6 g of NO equivalents were able to be bound by conversion of the hydroxide.

The nitrate/nitrite ratio (in % by weight) had not changed significantly, as was confirmed by wet chemical analysis of the corresponding ions.

Examples 1 to 5 show that the alkali metal compounds B) according to the invention bind nitrogen oxides at high temperatures without the nitrate/nitrite ratio changing.

Example 6

Comparative experiment without alkali metal compounds B) according to the invention 100 g of HITEC® (7 g of NaNO$_3$, 53 g of KNO$_3$, 40 g of NaNO$_2$) were heated to 595° C. in a stainless steel tube and maintained at this temperature (±5 K) for 2.5 hours. 10 l/h of argon were passed over the melt in order to convey the gases formed into two wash bottles. The two wash bottles were filled with 135.6 and 151.2 g, respectively, of hydrogen peroxide solution (3%). Analysis of the total nitrogen content indicated 22 and 5 mg/kg, respectively, in the solutions, corresponding to a total amount of 7.7 mg of nitrogen or 16.6 mg of NO, which were given off from the salt melts.

Experiment According to the Invention

In the same experimental set-up, 100 g of HITEC® (7 g of NaNO$_3$, 53 g of KNO$_3$, 40 g of NaNO$_2$) together with 1 g of Na$_2$CO$_3$ were heated to 600° C. and maintained at this temperature (±5 K) for 2.5 hours in a second experiment. 10 l/h of argon were likewise passed over the melt in order to convey the gases formed into two wash bottles. The two wash bottles were filled with 148.2 and 149.4 g of hydrogen peroxide solution (3%). Analysis of the total nitrogen content indicated 9 and 7 mg/kg, respectively, in the solutions, corresponding to a total amount of 4.8 mg of nitrogen or 10.2 mg of NO, which were given off from the salt melts. It was thus able to be shown that 1% of sodium carbonate as additive in HITEC® reduces the liberation of nitrogen oxides by about 40% by weight.

Example 7

Comparative experiment without alkali metal compounds B) according to the invention 100 g of solar salt (60 g of NaNO$_3$, 40 g of KNOB) were heated to 600° C. over a period of 2 hours in a stainless steel tube and maintained at this temperature (±5 K) for 1 hour. 5 l/h of water- and carbon dioxide-free air were passed over the melt in order to introduce the off-gases formed into a scrubbing tower. After the end of the experiment, the apparatus was flushed with argon for half an hour. The scrubbing tower was filled with 57 g of scrubbing solution composed of 0.1 mol/l of KMnO$_4$ together with 0.2 mol/l of NaOH in water. Analysis of the total nitrogen content indicated 51 mg/kg in the solution, corresponding to a total amount of 2.9 mg of nitrogen or 6.2 mg of NO, which were given off from the salt melts.

Experiment According to the Invention

In the same experimental set-up, 100 g of solar salt together with 1 g of Na$_2$CO$_3$ (corresponding to 0.11% by mass of carbon) were heated to 600° C. over a period of 2 hours in a stainless steel tube and maintained at this temperature (±5 K) for 1 hour in a second experiment. 5 l/h of water- and carbon dioxide-free air were passed over the melt in order to introduce the off-gases formed into a scrubbing tower. After the end of the experiment, the apparatus was flushed with argon for half an hour. The scrubbing tower was filled with 56 g of scrubbing solution composed of 0.1 mol/l of KMnO4 together with 0.2 mol/l of NaOH in water. Analysis of the total nitrogen content indicated 34 mg/kg in the solution, corresponding to a total amount of 1.9 mg of nitrogen or 4.1 mg of NO, which were given off from the salt melts.

It was thus able to be shown that 1% of sodium carbonate as additive in solar salt reduces the liberation of nitrogen oxides by about 30%.

Examples 6 and 7 show that the alkali metal compounds B) according to the invention greatly reduce the liberation of nitrogen oxides at very high temperatures.

The invention claimed is:
1. A process for generating heat and/or electricity comprising utilizing a heat transfer medium comprising a nitrate salt composition comprising as significant constituents

A) an alkali metal nitrate and an alkali metal nitrite in a total amount in the range from 98 to 99.8% by weight and B) an alkali metal compound selected from the group consisting of B2) alkali metal carbonate and B3) alkali metal compound which decomposes into alkali metal oxide or alkali metal carbonate in the temperature range from 250° C. to 600° C., in a total amount for component B) in the range from 0.2 to 2% by weight, based on the nitrate salt composition;

wherein, when component B) is B2), A) is present in a total amount in the range from 98 to 99.01% by weight and B2) is present in a total amount from 0.99 to 2% by weight in power stations, wherein the process comprises heating the heat transfer media by a heat source, transferring the heat from the heat transfer media (i) to another medium with this other medium then being able to drive a turbine and/or feed the heat transfer media into a stock vessel until taken off in the molten state, pumped to a steam generator providing steam pressurized to above 100 bar driving a turbine and generator for supplying electric energy.

2. The process according to claim 1, wherein the process is carried out in solar thermal power stations.

3. The process according to claim 2 wherein the heat transfer medium and/or heat storage medium is a heat transfer medium in solar thermal power stations.

4. The process according to claim 3 wherein the heat transfer medium and/or heat storage medium is a heat storage medium in solar thermal power stations.

5. A process for generating heat and/or electricity comprising utilizing a heat transfer medium and/or heat storage medium comprising a nitrate salt composition comprising as significant constituents A) an alkali metal nitrate and optionally an alkali metal nitrite in a total amount in the range from 90 to 99.84% by weight and B) an alkali metal compound selected from the group consisting of BA) alkali metal peroxide $Met_2O_2$ in which Met is lithium, sodium, potassium, rubidium, or cesium, and BB) alkali metal superoxide $MetO_2$ in which Met is sodium, potassium, rubidium, or cesium, in a total amount in the range from 0.16 to 10% by weight, in each case based on the nitrate salt composition, wherein the process comprises heating the heat transfer media by a heat source, transferring the heat from the heat transfer media (i) to another medium with this other medium then being able to drive a turbine and/or feed the heat transfer media into a stock vessel, until taken off in the molten state, pumped to a steam generator producing steam pressurized to above 100 bar, driving a turbine and generator for supplying electric energy.

6. A process for heating reaction apparatuses of chemical production plants, comprising heating heat transfer media by a heat source and transferring the heat flow to the reaction apparatuses, wherein the heat transfer media comprises a nitrate salt composition comprising as significant constituents A) an alkali metal nitrate and an alkali metal nitrite in a total amount in the range from 98 to 99.8% by weight and B) an alkali metal compound selected from the group consisting of B2) alkali metal carbonate and B3) alkali metal compound which decomposes into alkali metal oxide or alkali metal carbonate in the temperature range from 250° C. to 600° C., in a total amount for component B) in the range from 0.2 to 2% by weight, based on the nitrate salt composition;

wherein, when component B) is B2), A) is present in a total amount in the range from 98 to 99.01% by weight and B2) is present in a total amount from 0.99 to 2% by weight.

* * * * *